US009928405B2

(12) United States Patent
De la Torre et al.

(10) Patent No.: US 9,928,405 B2
(45) Date of Patent: Mar. 27, 2018

(54) SYSTEM AND METHOD FOR DETECTING AND TRACKING FACIAL FEATURES IN IMAGES

(71) Applicant: Carnegie Mellon University, Pittsburgh, PA (US)

(72) Inventors: Fernando De la Torre, Pittsburgh, PA (US); Xuehan Xiong, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 17 days.

(21) Appl. No.: 15/166,317

(22) Filed: May 27, 2016

(65) Prior Publication Data

US 2016/0275339 A1 Sep. 22, 2016

Related U.S. Application Data

(63) Continuation-in-part of application No. 14/596,148, filed on Jan. 13, 2015.

(60) Provisional application No. 62/166,934, filed on May 27, 2015, provisional application No. 61/964,744, filed on Jan. 13, 2014, provisional application No. 62/122,064, filed on Oct. 9, 2014.

(51) Int. Cl.
*G06K 9/00* (2006.01)
*G06T 7/246* (2017.01)

(52) U.S. Cl.
CPC .......... *G06K 9/00281* (2013.01); *G06T 7/246* (2017.01); *G06T 2207/10016* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 5,802,220 A * | 9/1998 | Black | ............... | G06K 9/00248 382/100 |
| 8,121,347 B2 * | 2/2012 | Metaxas | ............ | G06K 9/00335 382/103 |
| 8,155,399 B2 * | 4/2012 | Liu | ........................ | G06K 9/621 382/118 |
| 9,152,847 B2 * | 10/2015 | Zhou | ................... | G06K 9/00281 |
| 9,218,542 B2 * | 12/2015 | Zhan | .................... | G06K 9/6217 |
| 9,405,982 B2 * | 8/2016 | Zhang | ................. | G06K 9/00597 |
| 9,633,250 B2 * | 4/2017 | Tuzel | ................. | G06K 9/00281 |
| 2008/0187174 A1 * | 8/2008 | Metaxas | ............ | G06K 9/00335 382/103 |
| 2014/0147022 A1 * | 5/2014 | Zhou | ................... | G06K 9/00281 382/118 |

(Continued)

OTHER PUBLICATIONS

Cao et al ("Face Alignment by Explicit Shape Regression", 2013).*

(Continued)

*Primary Examiner* — Avinash Yentrapati (57) ABSTRACT

The present invention relates to a system for detecting and tracking facial features in images and can be used in conjunction with a camera. Given a camera, the system will detect facial landmarks in images. The present invention includes software for real time, accurate facial feature detection and tracking in unconstrained images and videos. The present invention is better, more robust and faster than existing approaches and can be implemented very efficiently allowing real-time processing, even on low-power devices, such as mobile phones.

15 Claims, 5 Drawing Sheets

(56) References Cited

U.S. PATENT DOCUMENTS

| | | | |
|---|---|---|---|
| 2014/0185924 A1* | 7/2014 | Cao | G06K 9/00281 382/159 |
| 2014/0270374 A1* | 9/2014 | Unzueta | G06K 9/00248 382/103 |
| 2015/0043799 A1* | 2/2015 | Zhan | G06K 9/6217 382/131 |
| 2015/0169938 A1* | 6/2015 | Yao | G06K 9/00261 382/103 |
| 2015/0186748 A1* | 7/2015 | Cootes | G06K 9/6282 382/159 |
| 2015/0310306 A1* | 10/2015 | Song | G06K 9/46 382/159 |
| 2015/0347822 A1* | 12/2015 | Zhou | G06K 9/4628 382/118 |
| 2015/0363634 A1* | 12/2015 | Yin | G06K 9/00221 382/118 |
| 2016/0191995 A1* | 6/2016 | el Kaliouby | A61B 5/165 725/12 |
| 2016/0196665 A1* | 7/2016 | Abreu | G06T 11/00 345/427 |
| 2016/0205382 A1* | 7/2016 | Chen | G06K 9/6265 382/203 |
| 2016/0275721 A1* | 9/2016 | Park | G06T 17/205 |

OTHER PUBLICATIONS

Huang, et al., Facial Action Transfer With Personalized Bilinear Regression, Robotics Institute, Carnegie Mellon University, Oct. 2012.

\* cited by examiner

SYSTEM AND METHOD FOR DETECTING AND TRACKING FACIAL FEATURES IN IMAGES

RELATED APPLICATIONS

This application claims the benefit of U.S. Provisional Application Ser. No. 62/166,934, filed May 27, 2015, and is also a continuation-in-part of currently pending U.S. application Ser. No. 14/596,148, filed Jan. 13, 2015, which claims the benefit of U.S. Provisional Application Ser. No. 61/964,744, filed Jan. 13, 2014, and 62/122,064, filed Oct. 9, 2014, all of which are incorporated herein in their entirety.

GOVERNMENT RIGHTS

This invention was made with partial support of the government under the National Science Foundation Number U.S. Pat. No. 1,116,583. The government has certain rights in this invention.

FIELD OF THE INVENTION

This invention related to the field of facial feature detection and tracking in still and video images, and, in particular, presents a solution for facial feature detection and tracking using the supervised descent method.

BACKGROUND OF THE INVENTION

The problem addressed by the present invention is real-time, accurate facial feature detection and tracking in unconstrained images and videos. There are existing algorithms for detecting landmarks in images however; the prior art methods lack accuracy, robustness and can be too slow for real-time applications.

U.S. Pat. No. 8,121,347 ("System and Method for Detecting and Tracking Features in Images") proposes the formation of clustered shape subspaces corresponding to a set of images so that shape changes nonlinearly due to perspective projection and complex 3D movements. Then a traditional landmark localization algorithm is used on each of the clusters. There are several drawbacks of the proposed method: (1) it uses a model, and cannot represent asymmetric expressions well; (2) the method is slow because it has to search for each landmark along the diagonal; (3) the method to create the model has to cluster the data and hence is prone to local minima; and (4) it is unclear that richer and more discriminative features can be added. Instead the proposed method uses richer features and proposes a new and better algorithm for landmark localization.

U.S. Pat. No. 8,103,058 ("Detecting and Tracking Objects in Digital Images"), presents a solution for detecting and tracking objects in digital images which includes selecting a neighborhood for each pixel under observation, the neighborhood being of known size and form, and reading pixel values of the neighborhood. However, the described method does not work well for deformable objects, such as faces.

The problem of facial feature detection and tracking can be formulated as a non-linear least square problem. To solve non-linear least squares problems it is generally accepted that $2^{nd}$ order descent methods are the most robust, fast and reliable approach for nonlinear optimization of a general smooth function. However, in the context of facial feature detection and tracking, $2^{nd}$ order descent methods have two main drawbacks: (1) The function might not be analytically differentiable (e.g., when using histogram of gradients (HoG) features) and numerical approximations are impractical; and (2) The Hessian might be large and not positive definite.

It would therefore be desirable to provide a method of detecting and tracking facial features that addresses the identified deficiencies of the prior art methods.

SUMMARY OF THE INVENTION

The limitations and non-effectiveness of the prior art have been overcome by the present invention as described below. The present invention is used in conjunction with a digital still or video camera or a pre-recorded video. Given an image containing one or more faces, the present invention will detect and track facial landmarks in each of the faces. This invention can be used in many applications, including, but not limited to, face editing, facial expression analysis, face recognition, gaze estimation, facial expression transferring and any application that has to do with facial image analysis.

The invention formulates the facial feature detection and tracking as a non-linear least squares (NLS) problem and describes the "Supervised Descent Method" (SDM), a method for minimizing the NLS function. During training, the SDM learns a sequence of descent directions that minimizes the mean of NLS functions. In use, SDM minimizes the NLS objective using the learned descent directions without computing the Jacobian or the Hessian (that are required for Newton's method).

This method has some important and useful properties. Firstly, it can be implemented very efficiently, allowing real-time processing, even on low-power devices, such as mobile phones. Secondly, most of the processing of the present invention involves matrix operations so it can be easily parallelized and/or vectorized taking advantage of modern multi-core CPUs/GPUs. Thirdly, the size of the model is compact (a few megabytes). Fourth, the method can recover from tracking failure and allows long-term tracking. Fourthly, the method outperforms state-of-the-art approaches for facial feature detection and tracking.

These and other features, objects, and advantages of the present invention will be readily apparent to persons of ordinary skill in the art.

BRIEF DESCRIPTION OF THE DRAWING'S

FIG. 3 (a-d) show the predictions from the first 4 iterations of the proposed method. Dotted outlines indicate the predicted facial landmarks. a). step 0, the rectangle shows the face detector's output; b). step 1; c). step 2; d). step 3.

DETAILED DESCRIPTION OF THE INVENTION

In the present disclosure, numerous specific details are provided, such as examples of the method and of how the software works, to provide a thorough understanding of embodiments of the invention. Persons of ordinary skill in the art will recognize, however, that the invention can be practiced without one or more of the specific details. In other instances, well-known details are not shown.

The term "camera" as used herein shall mean the source of a digital still or video image. In addition to traditional still and video cameras, for purposes herein a camera could include, for example, a storage medium having a video file stored thereon could be a camera for purposes of this invention.

The term "microprocessor" as used herein shall mean an integrated circuit that contains all the functions for processing. This includes, for example, graphics processing units (GPUs), field-programmable gate array (FPGA), a traditional computer processor, or any other means of executing program instructions or otherwise processing data.

Supervised Descent Method (SDM)

The present invention describes the SDM in the context of face alignment.

Derivation of SDM

Given an image $d\in\Re^{m\times 1}$, of m pixels, $d(x)\in\Re^{p\times 1}$ indexes p landmarks in the image. h is non-linear feature extraction function (e.g., HoG) and $h(d(x))\in\Re^{p\times 1}$ in the case of extracting HoG features. During training, it is assumed that the correct p landmarks (in the preferred embodiment of the invention, 66 landmarks are used) are known, and they will be referred to as $x_*$ (see FIG. 5). Also, to reproduce the testing scenario, the face detector was run on the training images to provide an initial configuration of the landmarks ($x_0$), which corresponds to an average shape (see FIG. 2). In this setting, face alignment can be framed as minimizing the following function over $\Delta x$ $$f(x_0+\Delta x)=\|h(d(x_0+\Delta x))-\varphi_*\|_2^2, \quad (3)$$

where $\varphi_*=h(d(x_*))$ represents the HoG values in the manually labeled landmarks. In the training images, $\varphi_*$, and $\Delta x$ are known. This invention aligns the image with respect to a template $\varphi_*$ that will be learned during training.

Eq. 3 has several fundamental differences with previous work. First, in Eq. 3 no model of shape or appearance is learned beforehand from training data. Recall that in traditional methods such as Active Appearance Models, Constrained Local Models or Morphable Models, the non-rigid motion is modeled as a linear combination of shape basis learned by computing PCA on a training set. In our case, the shape model is a non-parametric one, and the landmark locations $x\in\Re^{2p\times 1}$ are optimized directly. This non-parametric shape model is able to generalize better to untrained situations (e.g., asymmetric facial gestures). Although the method can be used with a previously learned model. Second, the present invention uses HoG features extracted from patches around the landmarks to achieve a robust representation against illumination. Observe that the HoG operator is not differentiable and minimizing Eq. 3 using first or second order methods requires numerical approximations (e.g., finite differences) of the Jacobian and the Hessian. However, numerical approximations will be very computationally expensive. The goal of this invention (SDM) is to learn a series of descent directions and re-scaling factors (done by the Hessian in the case of Newton's method) such that it produces a sequence of updates ($x_{k+1}=x_k+\Delta x_k$) starting from $x_0$ that converges to $x_*$ in the training data.

Now, only for derivation purposes, It is assumed that h is twice differentiable. Such assumption will be dropped at a later part of the section Similar to Newton's method, a second order Taylor expansion is applied to Eq. 3 as, $$f(x_0+\Delta x)\approx f(x_0)+J_f(x_0)^\top\Delta x+\frac{1}{2}\Delta x^\top H(x_0)\Delta x, \quad (4)$$

where $J_f(x_0)$ and $H(x_0)$ are the Jacobian and Hessian matrices of $f$ evaluated at $x_0$. In the following, $x_0$ is omitted to simplify the notation. Differentiating (4) with respect to $\Delta x$ and setting it to zero gives us the first update for x, $$\Delta x_1=-H^{-1}J_f=-2H^{-1}J_h^T(\varphi_0-\varphi_*), \quad (5)$$

where the present invention made use of the chain rule to show that $$J_f=2J_h^T(\varphi_0-\varphi_*), \text{ where } \varphi_0=h(d(x_0)).$$

The first Newton step can be seen as projecting $\Delta\varphi_0=\varphi_0-\varphi_*$ onto the row vectors of matrix $R_0=-2H^{-1}J_h^T$. In the rest of the description, the present invention will refer to $R_0$ as a descent direction. The computation of this descent direction requires the function h to be twice differentiable or expensive numerical approximations for the Jacobian and Hessian. The present invention will directly estimate $R_0$ from training data by learning a linear regression between $\Delta x_*=x_*-x_0$ and $\Delta\varphi_0$. Therefore, this method is not limited to functions that are twice differentiable. However, note that during testing (i.e., inference) $\varphi_*$ is unknown but fixed during the optimization process. To use the descent direction during testing, the invention will not use the information of $\varphi_*$ for training. Instead, it rewrites Eq. 5 as a generic linear combination of feature vector $\varphi_0$ plus a bias term $b_0$ that can be learned during training, $$\Delta x_1=R_0\varphi_0+b_0. \quad (6)$$

Using training examples, the SDM will learn $R_0$, $b_0$ used in the first step of the optimization procedure.

It is unlikely that the algorithm can converge in a single update step unless $f$ is quadratic under x. To deal with non-quadratic functions, the SDM will generate a sequence of descent directions. For a particular image, Newton's method generates a sequence of updates along the image-specific gradient directions, $$x_k=x_{k-1}-2H^{-1}J_h^T(\varphi_{k-1}-\varphi_*). \quad (7)$$

$\varphi_{k-1}=h(d(x_{k-1}))$ is the feature vector extracted at previous landmark locations $x_{k-1}$. In contrast, SDM will learn a sequence of generic descent directions $\{R_k\}$ and bias terms $\{b_k\}$, $$x_k=x_{k-1}+R_{k-1}\varphi_{k-1}+b_{k-1}, \quad (8)$$

such that the succession of $x_k$ converges to $x_*$ for all images in the training set. Eq. (8) represents one possible update of the landmarks. In the following, we will develop the equations for the linear regression case, Eq. (8). Other more general regression/mappings from features to landmarks are possible and the modification of the algorithm is straight-forward. A more general update equation than Eq. (8) is:

i. $x_k=x_{k-1}+f(\varphi_{k-1})+b_{k-1}$,

Where $f(\varphi_{k-1})$ is a generic mapping or regression from image features to landmarks.

Learning for SDM

Below, we describe how to learn $R_k$, $b_k$ from training data (the linear regression case), but using a more generic regression f( ) is straight-forward. Assume a set of face images $\{d^i\}$ and their corresponding hand-labeled landmarks $\{x_*^i\}$ is given. For each image starting from an initial estimate of the landmarks $x_0^i$, $R_0$ and $b_0$ are obtained by minimizing the expected loss between the predicted and the optimal landmark displacement under many possible initializations. The L2-loss is chosen for its simplicity and this solve for the $R_0$ and $b_0$ that minimizes $$\underset{R_0,b_0}{\mathrm{argmin}}\sum_{d^i}\int p(x_0^i)\|\Delta x^i - R_0\varphi_0^i - b_0\|^2 dx_0^i, \quad (9)$$

where $\Delta x^i=x_*^i-x_0^i$ and $\varphi_0^i=h(d^i(x_0^i))$. It is assumed that $x_0^i$ is sampled from a Normal distribution whose parameters capture the variance of a face detector. The integration is then approximated with Monte Carlo sampling, and instead minimize $$\underset{R_0, b_0}{\arg\min} \sum_{d^i} \sum_{x_0^i} \|\Delta x_*^i - R_0 \phi_0^i - b_0\|^2. \qquad (10)$$

Minimizing Eq. 10 is the well-known linear least squares problem, which can be solved in closed-form.

The subsequent $R_k$, $b_k$ can be learned as follows. At each step, a new dataset $\{\Delta x_*^i, \varphi_k^i\}$ can be created by recursively applying the update rule in Eq. 8 with previously learned $R_{k-1}$, $b_{k-1}$. More explicitly, after $R_{k-1}$, $b_{k-1}$ is learned, the current landmarks estimate $x_k^i$ is updated using Eq. 8. A new set of training data is generated by computing the new optimal parameter update $\Delta x_*^{ki} = x_*^i - x_k^i$ and the new feature vector, $\varphi_k^i = h(d^i(x_k^i))$. $R_k$ and $b_k$ can be learned from a new linear regressor in the new training set by minimizing:

$$\underset{R_k, b_k}{\arg\min} \sum_{d^i} \sum_{x_k^i} \|\Delta x_*^{ki} - R_k \phi_k^i - b_k\|^2. \qquad (11)$$

The error monotonically decreases as a function of the number of regressors that are added. In all experiments, in 4 or 5 steps the algorithm has converged.

It is important to note, that a more generic mapping/regression functions $f(\varphi_{k-1})$ can easily be learned using standard methods that minimize:

$$\arg\min_{f(\cdot), b_0} \Sigma_{d^i} \Sigma_{x_0^i} \|\Delta x_*^i - f(\varphi_0) - b_0\|^2$$

For the first iteration, and we could proceed as before for the remaining iterations. Recall that if $f_k(\varphi_k) = R_k \varphi_k$ we have the method explained in the previous paragraphs.

Online Learning for SDM

SDM may have poor performance on an unseen sample that is dramatically different from those in the training set. It would be desirable to incorporate this new sample into the existing model without re-training. The following describes such a procedure that updates an existing SDM model in an online fashion. Below, we assume that $f$ is a linear mapping function. Assume that one is given a trained SDM model, represented by $\{R_k, b_k, \Sigma_k^{-1}\}$, where $\Sigma_k = \Phi_k \Phi_k^T$ and $\Phi_k$ is the data matrix where each of the columns represents a feature vector extracted from one particular training image and one particular landmark configuration. For a given new face image d, and labeled landmarks $x_*$, one can compute the initial landmark perturbation $\Delta x_0 = x_* - x_0$ and the feature vector extracted at $x_0$, $\varphi_0 = h(d(x_0))$. Using recursive least squares algorithm, SDM can be re-trained by iterating the following three steps:

Step 1—update the inverse covariance matrix, $$\Sigma_k^{-1} = \Sigma_k^{-1} - \Sigma_k^{-1} \varphi_k (w^{-1} + \varphi_k^T \Sigma_k^{-1} \varphi_k)^{-1} \varphi_k^T \Sigma_k^{-1}.$$

Step 2—update the generic descent map, $$R_k = R_k + (\Delta x_k - R_k \varphi_k) w \varphi_k^T \Sigma_k^{-1}.$$

Step 3—generate a new pair $\Delta x_{k+1}$ and $\varphi_{k+1}$ and go to Step 1, $$\Delta x_{k+1} = \Delta x_k - R_k \varphi_k$$

$$\varphi_{k+1} = h(d(x_* + \Delta x_{k+1})).$$

Above w is a scalar representing the weight for the new sample. Note that above we did not show how to update $b_k$.

In practice, one can incorporate the bias term into $R_k$ by augmenting the feature vector with one.

Algorithm for Facial Feature Detection

This embodiment of the invention describes more specifically the SDM method for facial feature detection in unconstrained images and videos. For instance, low resolution images, images with highly cluttered background. The embodiment assumes the existence of a database of training data, as described below.

Figure 1:
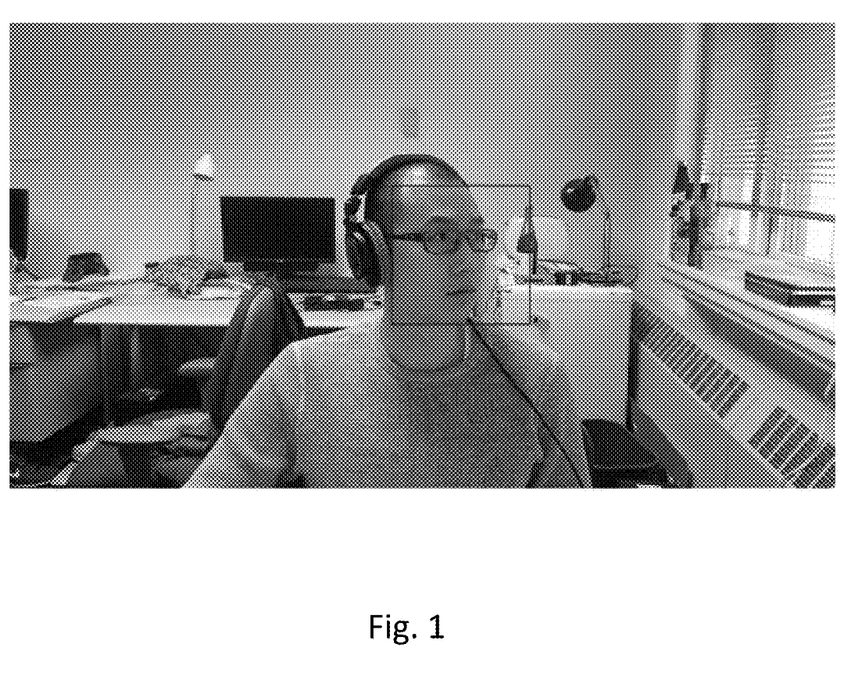
FIG. 1 shows the output from the face detector, showing the bounding box in blue.

Step 1— A face detector which returns a bounding box containing a face, as shown in FIG. 1, is used. The face image is cropped from the bounding box and then normalized into a fixed dimension rectangle, which, in the preferred embodiment, is a 200 by 200 pixel square, although any size could be used.

Figure 2:
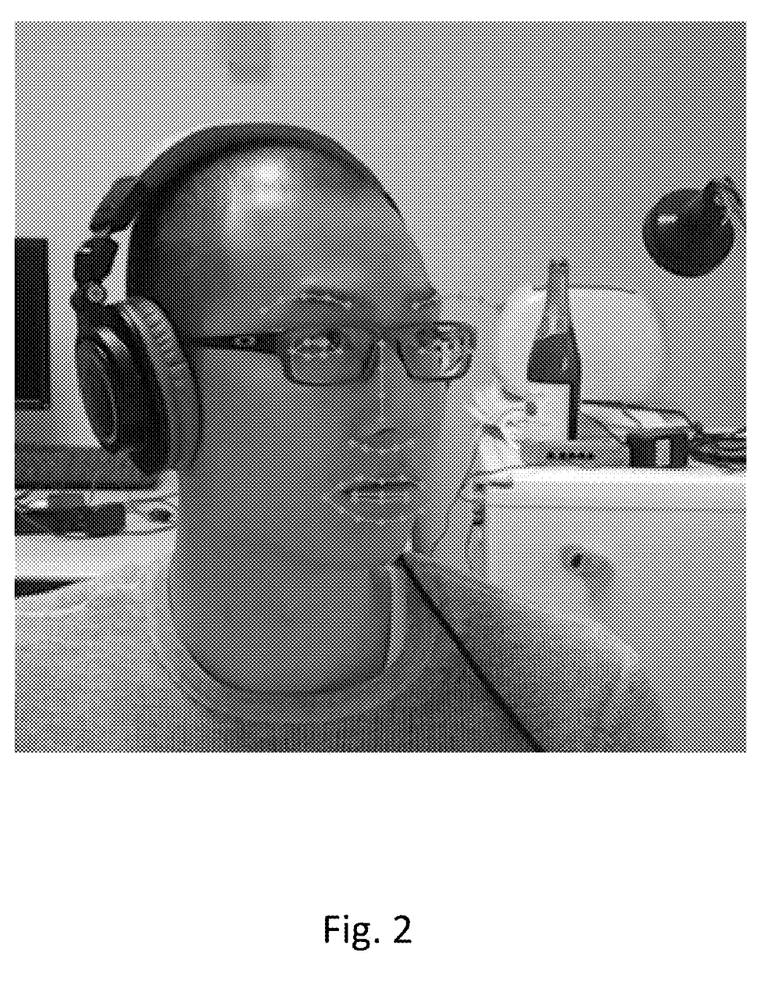
FIG. 2. Shows the application of an average face to provide the initial estimate of the location of the facial landmarks.

Step 2— The landmark locations $x_0$ are initialized by placing an average face in the center of the normalized bounding box given in Step 1. The average face is computed offline using a large face database. FIG. 2 shows the initialized facial landmarks (plotted in green) of the average face as applied to the face in the normalized bounding box.

Step 3— This step involves regression from image features to displacement of landmarks. The image features are computed in a local patch around each predicted landmark using a histogram of gradients (HoG). The feature extraction step may take place at different resolutions (e.g., different levels of an image pyramid). The symbol $\varphi_k$ is used to denote the image features extracted at the $k^{th}$ iteration. The displacement of landmarks is computed using a pre-learned function $f$ that takes the above image features as inputs:

$$x_k = x_{k-1} + f_k(\varphi_k).$$

In the case of linear regression, $f_k(\varphi_k) = R_k \varphi_k$, but any regression or mapping method can be used. The displacement of landmarks can be represented directly by the (x, y) image coordinates or more compactly by a shape model, such as a principal component analysis (PCA) model. Better results are achieved by regressing onto image coordinates.

To compute the HoG for each landmark, a square image patch surrounding the landmark is used. Preferably, the image patch will be 28×28 pixels. Calculating the HoG descriptor computation consists of the following steps. First, an image gradient is computed for the image patch. The image patch is then divided into 4×4 pixel spatial regions. For each pixel in the region a vote for an orientation histogram bin is calculated based on the orientation of the gradient element centered on it. Votes are accumulated into orientation bins over local spatial regions. The orientation bins are evenly spaced over 0°-180°, and in the preferred embodiment, are 22.5° wide. The vote is computed as the gradient magnitude. Lastly, in each spatial region, the accumulated histogram bins are normalized into unit vectors and all 4×4 unit vectors are concatenated into a column vector. Recall that many other features, other than HoG, could be used for the method.

Figure 3:
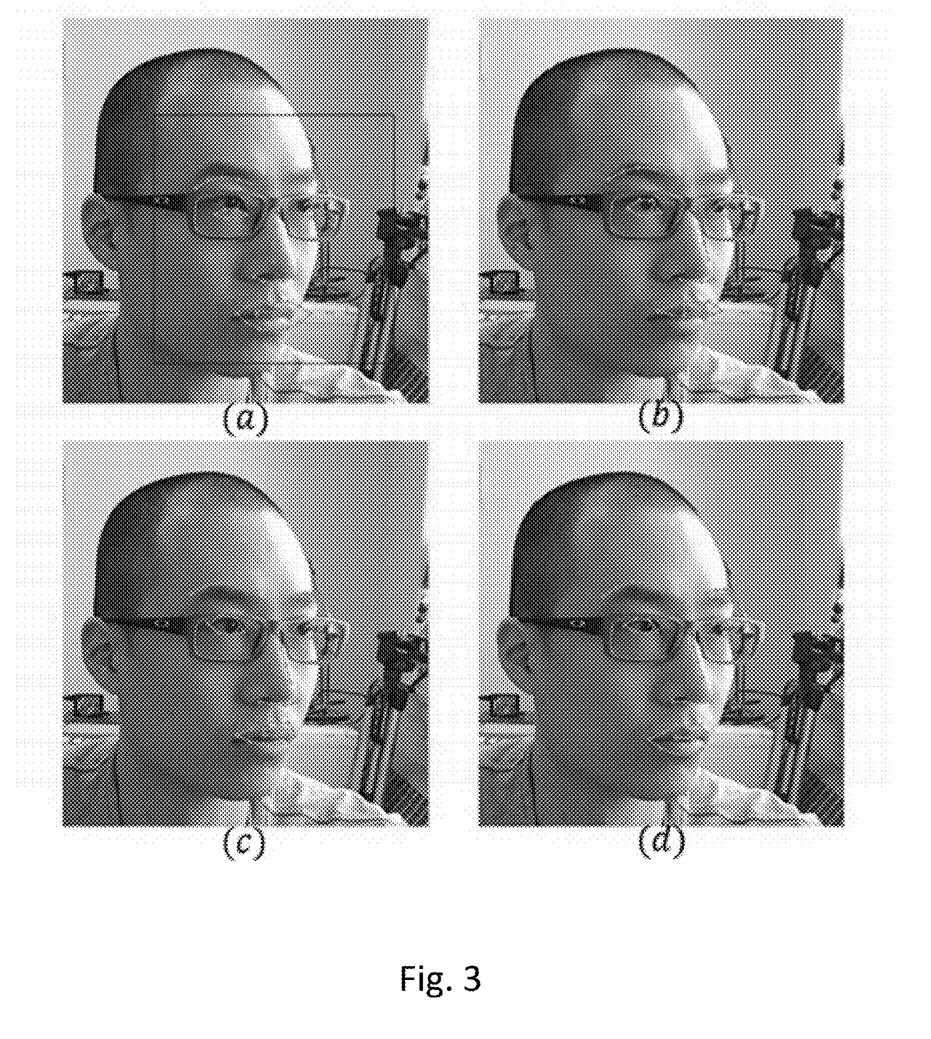

Step 4— This step involves iterating Steps 2 and 3. The number of iterations is defined in the training stage. The same number of iterations is used in testing. FIG. 3 shows the first four iterations of the present method.

Figure 4:
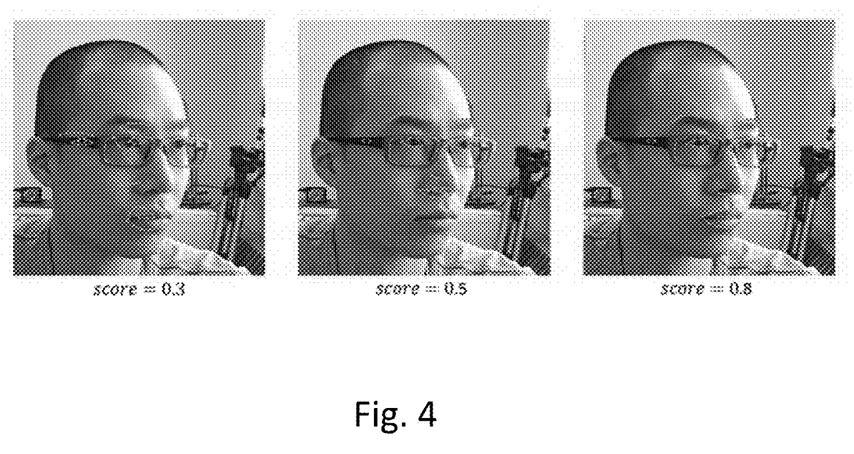
FIG. 4 shows three images with their prediction confidence scores attached.

Step 5—This step provides a calculation of a prediction score: A classifier is trained offline on landmarks well positioned and landmarks that do not correspond to facial features. The output of the classifier is used as the prediction score to evaluate quality of landmark prediction. FIG. 4 shows three examples of prediction scores. The score is between 0 and 1. Values of the confidence score closer to 1 indicate more confidence in the prediction. The score can be observed increasing as the landmark prediction becomes more accurate. This confidence score can be used to determine whether detection of landmarks is bad or the tracking is lost.

Algorithm for Facial Feature Tracking

The tracking of facial features is very similar to the detection of facial features described above. The main differences are that the tracking process happens from frame to frame in a video and the confidence score calculate in Step 5 below is used to determine if the face has been lost from frame to frame.

Step 1—The face image is normalized. From the prediction made in the previous frame, an estimate of scale and orientation of the face in the current frame is obtained. Using that information, the current frame is normalized to the same scale and orientation that were used in training.

Step 2—The landmark locations $x_0$ are initialized by placing an average face in the center of the normalized image given in step 1.

Step 3—This step involves regression from image features to displacement of landmarks. The image features are computed in a local patch around each predicted landmark using a histogram of gradients. The feature extraction step may take place at different resolutions (e.g., different levels of an image pyramid). The symbol $\varphi_k$ is used to denote the image features extracted at the $k^{th}$ iteration. The displacement of landmarks is computed using a pre-learned function $f$ that takes the above image features as inputs:

$$x_k = x_{k-1} + f_k((\varphi_k)).$$

The landmark locations may be represented by (x, y) image coordinates or more compactly by a shape model, such as a PCA model.

Step 4—This step involves iterating Steps 2 and 3. The number of iterations is defined in the training stage. The same number of iterations is used in testing.

Step 5—This step involves calculation of a prediction score. A classifier is trained offline on faces and non-faces. The output of the classifier is used as the prediction score to evaluate quality of landmark prediction. If the score is lower than a threshold, we determine that the tracker is lost (i.e., no face can be found in the frame). FIG. 4 shows three examples of prediction scores. If it is determined that no face has been found in the frame, the face tracker is run again and Steps 1-5 are repeated.

Algorithm for Multi-View Facial Feature Tracking

An extension of the proposed SDM to improve tracking performance is possible by using multiple models rather than only one. The tracking of facial features is very similar to the detection of facial features described in the previous sections, the main difference is an additional step to select the adequate model.

Step 1—The face image is normalized. From the prediction made in the previous frame, an estimate of scale and orientation of the face in the current frame is obtained. Using that information, the current frame is normalized to the same scale and orientation that were used in training and the face is placed in a bounding box.

Step 2—This step involves selection of SDM models. A set of models are trained for different views of faces. The training set is divided into different clusters according to face shapes and their appearances. The shape and appearance predicted from the previous frame are compared with the means of each cluster. The model with the closest distance to the mean is selected. The number of clusters is chosen using a validation dataset. When consecutive frames land in the boundary of two clusters, the model tends to alternate between the two. This will result in unpleasant effects (e.g., unstable, jumping landmarks) in tracking. One can enforce a temporal smoothness in the model selection procedure to eliminate such undesired effects.

Step 3—The landmark locations $x_0$ are initialized by placing an average face in the center of the bonding box used in Step 1. (i.e., the normalized image given in step 1). For different views, a different average face is used. Several possible ways of initializing the landmarks are possible, the only requirement is that the same process is done in training and testing. For instance, a simple initialize is applying an average landmark averaging to the center of the bounding box.

Step 4—This step involves regression from image features to displacement of landmarks. The image features are computed in a local patch around each predicted landmark using a histogram of gradients. The feature extraction step may take place at different resolutions (e.g., different levels of an image pyramid). The symbol $\varphi_k$ is used to denote the image features extracted at the $k^{th}$ iteration. The displacement of landmarks is computed using a pre-learned function $f$ (a regressor) that takes the above image features as inputs:

$$x_k = x_{k-1} + f_k(\varphi_k).$$

A different function is learned for each view. A set of regressors is trained during the training phase using the Supervised Descent Method to update the landmarks during testing. For training, the algorithm has a set of manually labeled images and a face detector that detects a bounding box in each of the images. Preferably, several models can be trained for different face poses.

The landmark locations may be represented by (x, y) image coordinates or more compactly by a shape model, such as a PCA model.

Step 5—This step involves iterating Steps 2 through 4. The number of iterations is defined in the training stage. The same number of iterations is used in testing.

Step 6—This step involves calculation of a prediction score. Multiple classifiers are trained offline on faces and non-faces, one for each view. The output of the classifier is used as the prediction score to evaluate the quality of landmark prediction. If the score is lower than a threshold, we determine that the tracker is lost (i.e., no face can be found in the frame). If it is determined that no face has been found in the frame, the face detector is run again and Steps 1-6 are repeated once a face is found. A classifier is a function that maps image features to discrete classes. In our case, the two classes which are correctly predicted landmarks, and incorrectly predicted landmarks. Such classifier is trained with images where the landmarks in the images are well place (positive class) and face images where the landmarks are incorrectly placed (negative images). Given a set of landmarks in an image, the classifier will return 1 if the landmarks are well placed in the image and −1 if they are not well placed.

Facial Feature Detection and Tracking During Training

Figure 5:
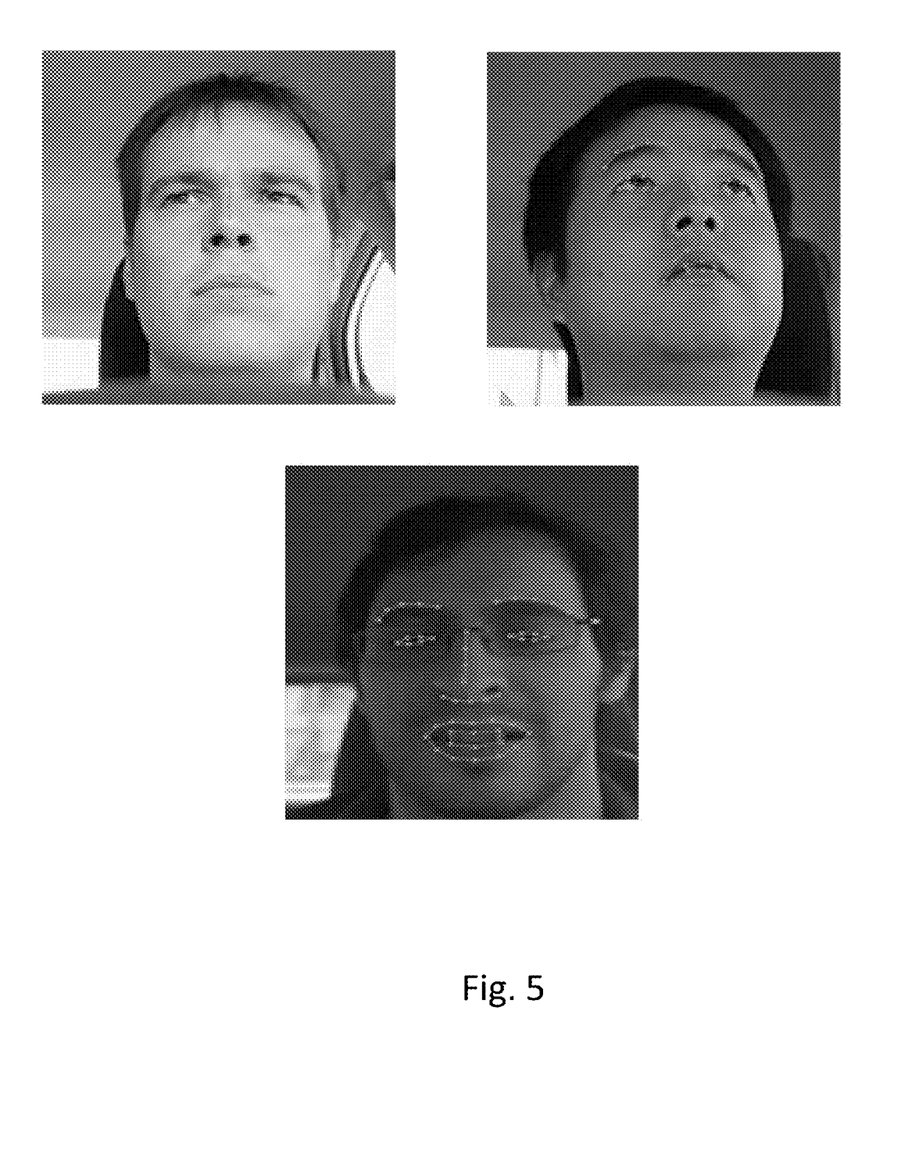
FIG. 5 illustrates the placement of facial landmarks of a few training samples.

Step 1— This step involves the manual location of facial landmarks in an image. In the preferred embodiment of the invention, 66 landmarks are manually placed to indicate the locations of facial features, although any number of landmarks may be used. The training data consists of a set of face images having their corresponding landmarks $\{x_*^i\}$ labeled. Some examples of facial images having features marked with landmarks are shown in FIG. 5. As face images may be in different resolutions, all face images are normalized to a similar orientation and scale and then placed in the same coordinate system.

Step 2—This step involves the generation of initial landmark estimates. For each normalized image, an average face is placed in the center of frame. Additional samples are added by perturbing the average face and those are used as initial estimates of the landmarks $\{x_0^i\}$.

Step 3— The third step involves learning regression from image features to displacements of landmark. For each sample, the image features are computed in the local patch around each predicted landmark using, in the preferred embodiment, a histogram of gradients. The feature extraction step may take place at different resolutions (e.g., different levels of an image pyramid). The symbol $\varphi_k^i$ is used to denote the image features extracted from the $i^{th}$ sample at the $k^{th}$ iteration. The displacement of landmarks $\Delta x_*^i$ is computed as the difference between the current landmark prediction and the labeled landmarks.

$$\Delta x_*^i = x_k^i - x_*^i$$

The landmark locations may be represented by (x, y) image coordinates or more compactly by a shape model, such as a PCA model. A function $f$ (regressor) is learned as a mapping between the two by minimizing the following loss:

$$\min_f \sum_i \|f(\phi_k^i) - \Delta x_*^i\|^2$$

Step 4— In this step, the landmarks are updated. For each sample, landmarks are updated using the following equation, where $f$ is the learned function from step 3, $$x_k^i = x_{k-1}^i + f(\varphi_k^i).$$

Step 5—This step involves iterating Steps 3 and 4 until convergence is achieved. The method is said to be converged in training if the predicted landmark locations are sufficiently close to the true landmarks.

While specific embodiments of the present invention have been provided, it is to be understood that these embodiments are for illustration purposes and are not limiting. Many additional embodiments will be apparent to persons of ordinary skill in the art. It should also be noted that the method could be applied to shapes other than faces, given an appropriate set of training images for the desired shape.

We claim:

1. A system for detecting and tracking features in a series of images of an object, comprising:
   a camera;
   a microprocessor, in communication with said camera
   software, executed by said processor, said software performing the functions of detection and tracking,
   wherein said function of detection includes the steps of:
   (a) detecting the presence of said object in an image from said series of images and placing said object in a bounding box;
   (b) initializing a set of landmarks in the bounding box; and
   (c) applying multiple iterations of a regression function learned during a training phase to update said landmarks by mapping image features of said object to said landmarks; and wherein said function of tracking includes the steps of:
   (d) applying a classifier to determine how closely said features map to said landmarks in said object;
   (e) repeating steps (c)-(d) for the next image in said series of images if said classifier determines that the mapping of features to landmarks exceeds a predetermined threshold; and
   (f) repeating steps (a)-(d) for the next image in said series of images if said classifier determines that the mapping of features to landmarks does not exceed said predetermined threshold.

2. The system of claim 1 wherein said training phase includes
   (a) training said classifier to classify landmarks as correctly or incorrectly placed; and
   (b) training a set of regressors to update said landmarks.

3. The system of claim 2 wherein said classifier is a function that maps image features to discrete classes.

4. The system of claim 3 wherein said discrete classes includes correctly predicted landmarks, and incorrectly predicted landmarks.

5. The system of claim 4 wherein said classifier is trained with images where the landmarks in the images are well place to learn correctly predicted landmarks and images where the landmarks are incorrectly placed to learn incorrectly-placed landmarks.

6. The system of claim 4 wherein said classifier indicates whether said landmarks are well-placed in said image or are not well-placed in said image.

7. The system of claim 1 wherein said set of regressors is trained using the Supervised Descent Method to update the landmarks.

8. The system of claim 2 wherein said features of said object are expressed as a vector of histograms of gradients.

9. The system of claim 7 wherein said regressors are based on a set of training data.

10. The system of claim 9 wherein said training data consists of a plurality of images having landmarks manually applied thereto.

11. The system of claim 1 wherein said object is a face.

12. The system of claim 1 wherein said function of detection further includes the initial steps of
   (a) detecting said object within said image;
   (b) normalizing said object to the scale and orientation of said images in said training data; and
   (c) selecting one or more models which have been trained for different views of said object.

13. The system of claim 12 wherein each of said models has its own classifier and set of regressors.

14. The system of claim 1 wherein said step of initializing said set of landmarks is accomplished by placing an image of an average object in the center of said normalized object and transferring landmarks from said average object to said normalized object.

15. The system of claim 2 wherein said landmarks are manually placed on said objects in said images during said training phase.

* * * * *

UNITED STATES PATENT AND TRADEMARK OFFICE
CERTIFICATE OF CORRECTION

Page 1 of 1

PATENT NO. : 9,928,405 B2
APPLICATION NO. : 15/166317
DATED : March 27, 2018
INVENTOR(S) : Fernando De la Torre et al.

It is certified that error appears in the above-identified patent and that said Letters Patent is hereby corrected as shown below:

In the Specification

In the "GOVERNMENT RIGHTS" section:
"This invention was made with partial support of the government under the National Science Foundation Number U.S. Patent No. 1,116,583. The government has certain rights in this invention." should read "This invention was made with United States government support under 1116583 and 0931999 awarded by the National Science Foundation. The U.S. government has certain rights in the invention."

Signed and Sealed this
Twenty-fourth Day of December, 2024

Derrick Brent
*Acting Director of the United States Patent and Trademark Office*